Feb. 24, 1970   C. A. GLASS ET AL   3,497,578
METHOD OF FORMING ARTICLES TO CLOSE DIMENSIONAL TOLERANCES
IN A HYDROSTATIC PRESS
Filed Dec. 13, 1967   6 Sheets-Sheet 1
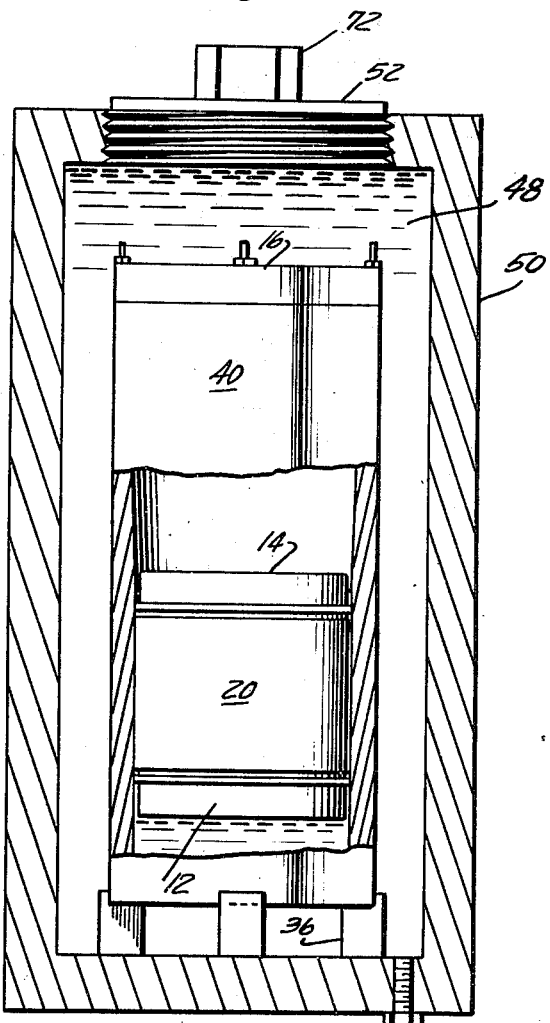
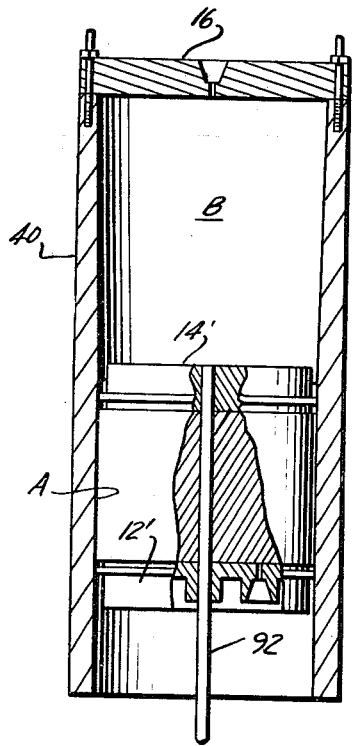
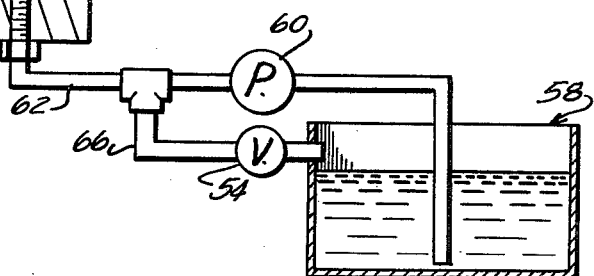
Cecil A. Glass
Wallace E. Silver INVENTOR.
BY Roy Miller
ATTORNEY
Gerald F. Baker
AGENT Cecil A. Glass
Wallace E. Silver
INVENTORS Fig. 3
Fig. 4
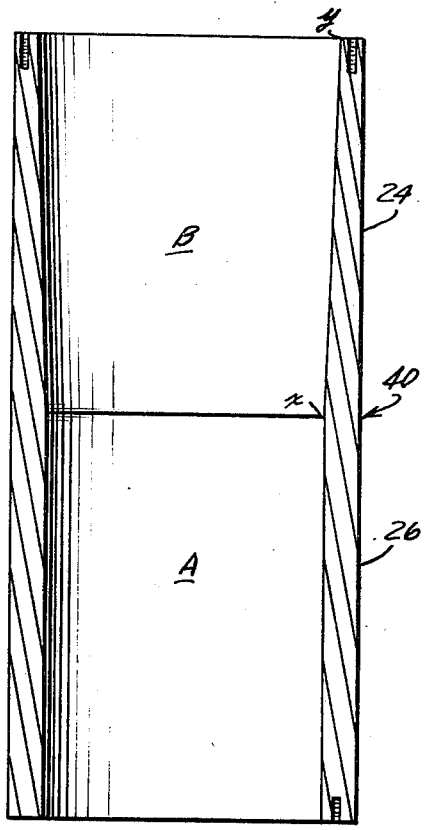
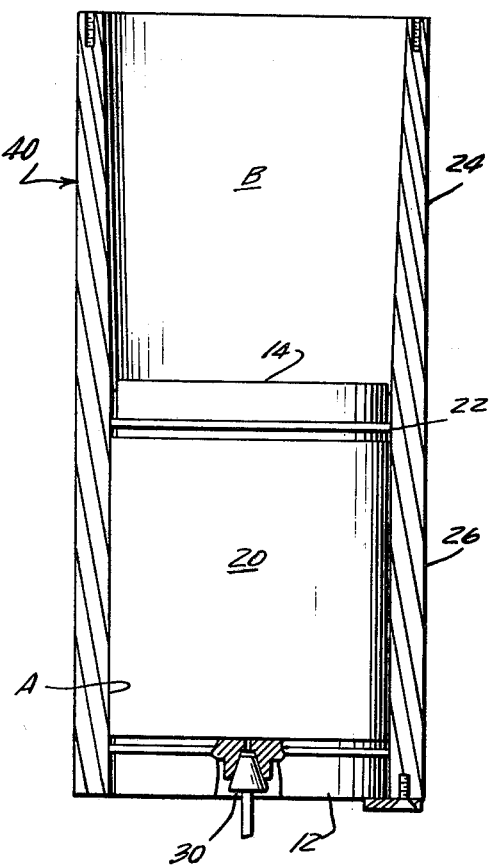
Cecil A. Glass
Wallace E. Silver
INVENTORS
BY Roy Miller
ATTORNEY
Gerald F. Baker
AGENT Cecil A. Glass
Wallace E. Silver
INVENTORS

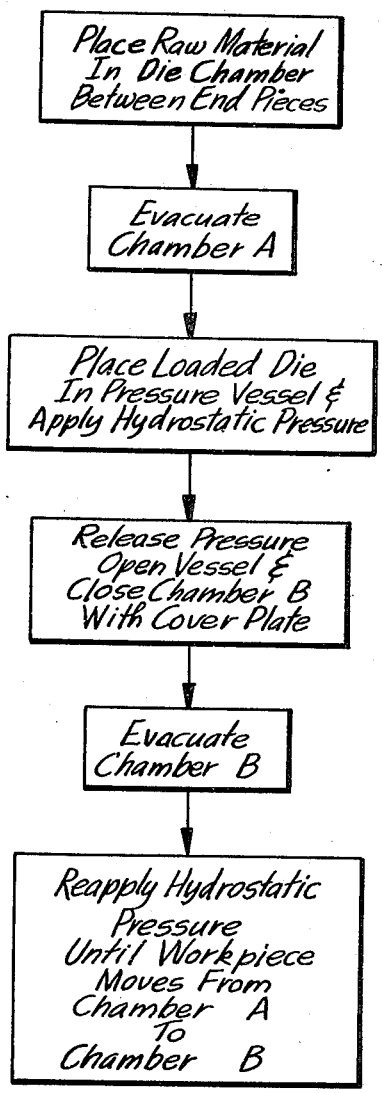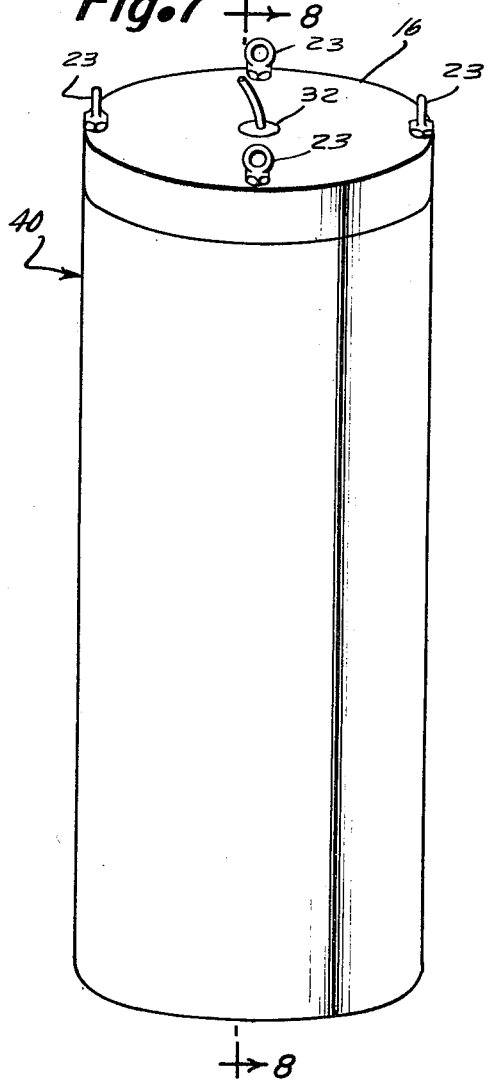

United States Patent Office 3,497,578
Patented Feb. 24, 1970

3,497,578
METHOD OF FORMING ARTICLES TO CLOSE DIMENSIONAL TOLERANCES IN A HYDROSTATIC PRESS
Cecil A. Glass and Wallace E. Silver, China Lake, Calif., assignors to the United States of America as represented by the Secretary of the Navy
Filed Dec. 13, 1967, Ser. No. 690,633
Int. Cl. C06b 21/02
U.S. Cl. 264—3                4 Claims

ABSTRACT OF THE DISCLOSURE

Articles are formed of compacted raw material in a hydrostatic press using a die designed to contain the material for compaction in one end and to receive the ejected finished article in the other end.

GOVERNMENT INTEREST

The invention described herein may be manufactured and used by or for the Government of the United States of America for governmental purposes without the payment of any royalties thereon or therefor.

BACKGROUND OF THE INVENTION

The conventional method of pressing explosive aggregates to a desired shape involves the use of a single or double acting ram press, with the upper and lower rams corresponding to the diameter of the pressed billet. This is essentially a batch process, where one billet is produced per pressing cycle. For billets over six inches in diameter, high tonnage presses must be used to achieve the required degree of pressurization. A bag method of pressing has also been developed to be used in conjunction with an isostatic press. An isostatic press is essentially a pressure chamber, filled with a liquid medium, by which the necessary pressure is applied to form the billet. In the bag method the aggregate is loaded into a rubber bag, which is then evacuated prior to pressing. Since the rubber bag is non-rigid, the pressed explosive piece is irregular and must be machined to the desired dimensions after being pressed.

In conventional single and double acting ram presses, large presses with capacities in excess of a thousand tons are necessary to press billets larger than six inches in diameter. This also involves the use of large and expensive die sets, which are difficult and time consuming to install and remove. The conventional press utilizes a single pressurization cycle, whereas, with an isostatic press, any number of pressing cycles can be used in forming a billet. It has been found that higher pressed densities have been achieved with billets subjected to more than one pressurization cycle. This also makes it possible to obtain high quality pressed billets with a length to diameter ratio of up to 1.5, by subjecting the billet to several pressurization cycles during formation. A length to diameter ratio of one is about the maximum feasible with a conventional press if a high quality billet is to be obtained.

SUMMARY

According to the present invention billets are pressed in an isostatic press using a pressing die and two end pieces. By this method a billet is pressed exactly to shape and provisions for all dimensional tolerances are designed into the die itself. After pressing, the billet is ejected in a novel manner from one end of the pressing die to the other. A counterbored ejection chamber is included within the pressing die for facilitating removal of the billet by atmospheric pressure or pressurized fluid, eliminating the need for a mechanical ejection press to remove the pressed billet from the die. For large diameter billets, mechanical ejection would involve the construction of a special single acting ram type of ejection press, possessing a large bed to accommodate the die.

The method of pressing and ejecting high explosive billets according to the present invention is particularly advantageous where large diameter billets are concerned. The diameter of the billet which can be pressed by this method is limited only by the diameter of the pressure chamber, and the pressures which can be withstood by the die assembly and chamber walls.

BRIEF DESCRIPTION OF THE SEVERAL VIEWS OF THE DRAWING

FIG. 1 is a diagrammatic view, partly in cross section and with parts broken away to illustrate the operation and use of a pressure tank and die according to the invention;

FIG. 3 is a detail section of a typical die member;

FIGS. 4, 5 and 6 are sectional views illustrating the several steps used in practicing the disclosed invention;

FIG. 7 is a perspective view of an assembled die;

FIG. 11 is a flow diagram illustrating the disclosed process; and

FIG. 12 is a diagrammatic view, partly in cross section and with parts broken away to illustrate a modified die assembly.

DETAILED DESCRIPTION OF THE INVENTION

Figure 9:
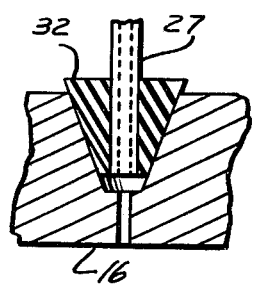
FIG. 9 is a sectional view taken on the line 9—9 of FIG. 8.

Turning now to FIG. 1 of the drawing, we have shown an isostatic press including a pressure tank 50 filled with a fluid 48. The fluid 48, which may be oil, glycerine or the like, is delivered to the pressure tank 50 through conduit 62 by means of a pressure pump 60. A reservoir 58 is provided to supply fluid when needed and to receive return fluid through conduit 66 when the relief valve 54 is operated. A pressing die 40 is situated in the pressure tank on a plurality of standoffs 36 so that fluid may easily enter from the bottom and apply pressure on the end piece 12 equal to the pressure on the die 40 and on the cover plate 16. Situated inside the die 40 are the billet or workpiece 20 and another end piece 14. The pressure tank 50 is sealed by means of a screw plug 52 which may be inserted or replaced by applying a torque to member 72.

Figure 2:
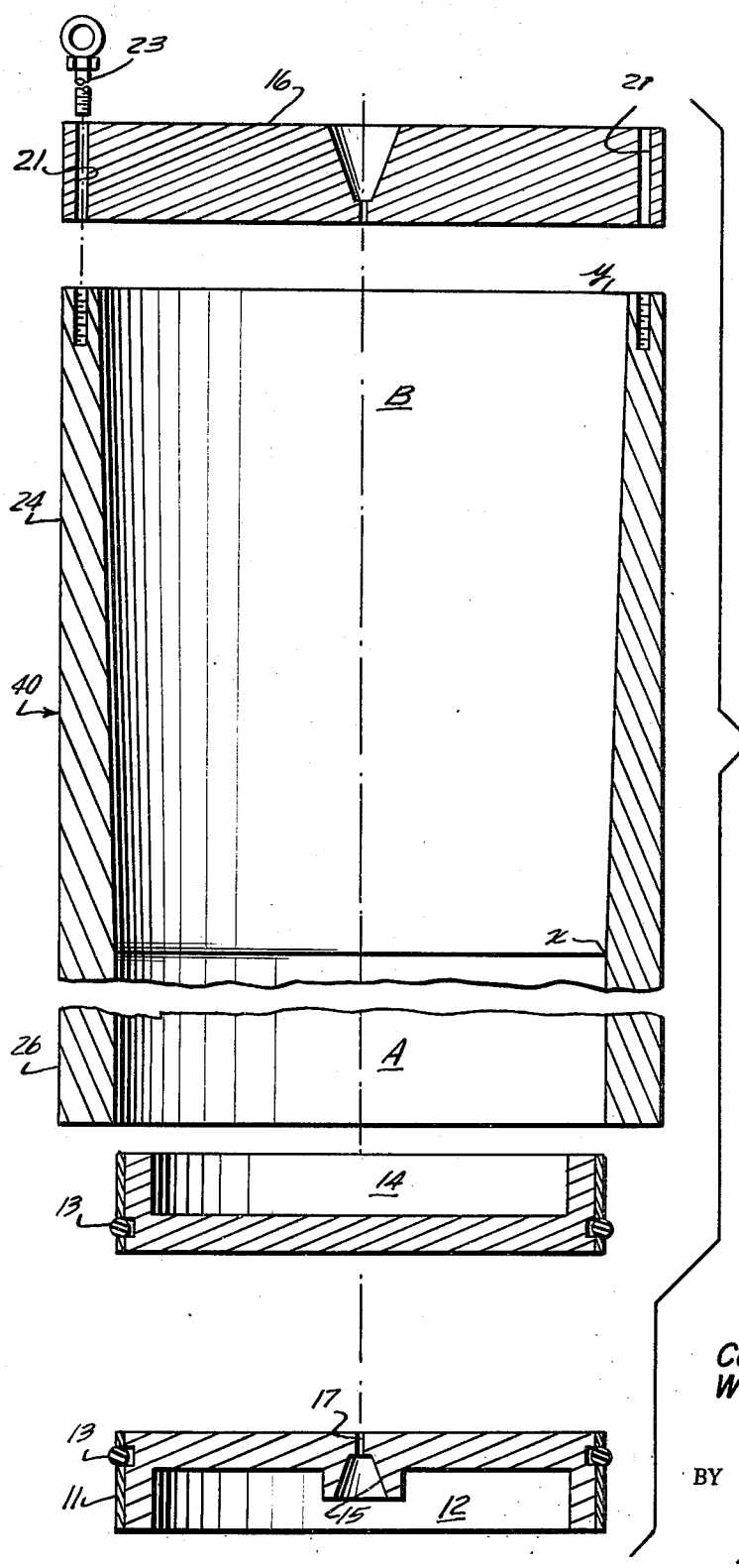
FIG. 2 is an exploded sectional view illustrating the several components making up a typical die assembly.

Looking now at FIGS. 2 and 3, it may be seen that the pressing die 40 has two chambers A and B. The walls of chamber A, in the embodiment illustrated, are parallel while the walls of chamber B are counterbored so that a taper is formed from X to Y, the diameter at X being identical with the diameter of chamber A and the diameter at Y being slightly larger. Thus the walls 26 are of uniform thickness while the walls 24 are tapered. As shown in FIG. 4, the end pieces 14 and 12 are placed on either side of work material 20 in chamber A. As a practical matter, end piece 12 is placed in the chamber first and secured in place by lugs fastened to the end wall 26. The material 20 is placed on end piece 12 and then end piece 14 placed in position. Of course, the end pieces 12, 14 may be reversed if desired. After the end pieces are in place on either side of material 20, a tapered plug 30 is inserted in the opening 15 in end plate 12 and vacuum is applied to evacuate chamber A.

Figure 5:
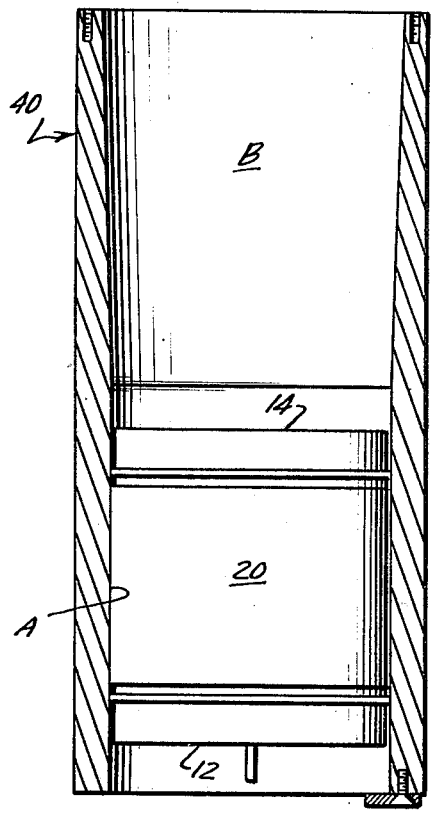
Figure 6:
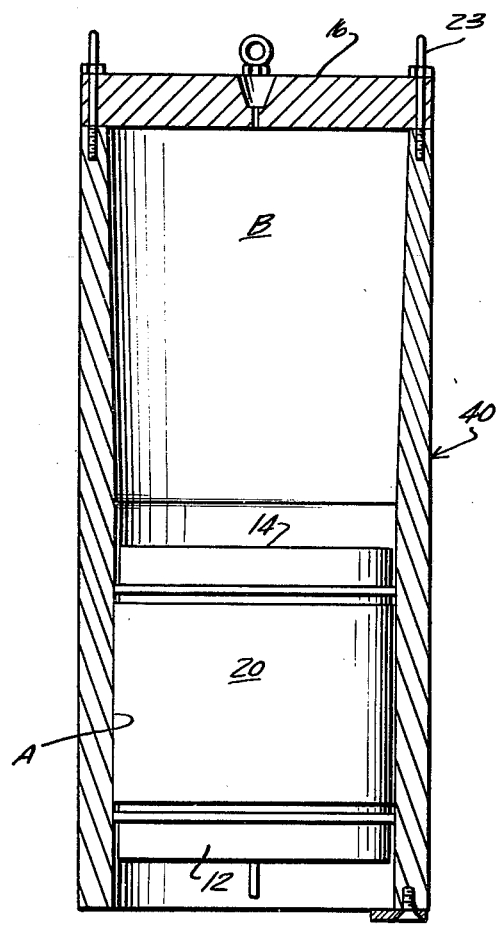
Figure 8:
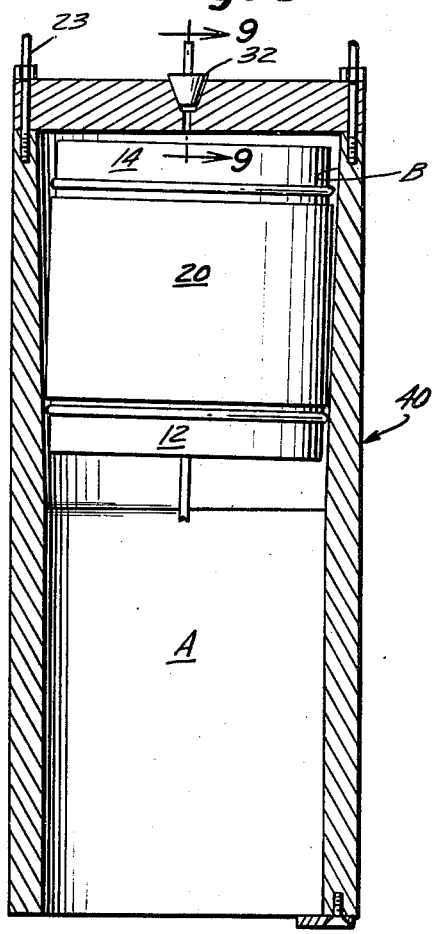
FIG. 8 is a sectional view taken on the line 8—8 of FIG. 7.
Figure 10:
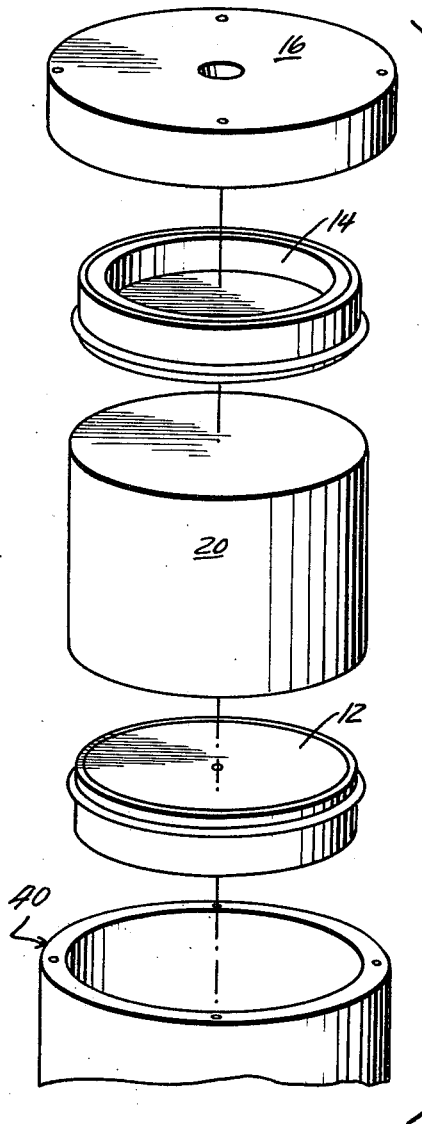
FIG. 10 is an exploded perspective view illustrating the final disassembly with the end pieces and billet being removed from the mold.

The pressing die 40 is then placed in pressure tank 50 and fluid is forced under pressure into the tank. Since the plate 16 is not in place at this time, fluid pressure can act on all sides of the workpiece 20. FIG. 5 represents the die assembly after pressure has been applied for a period of time sufficient to compress workpiece 20, and the assembly is ready for placement of the plate 16, as shown in FIG. 6, for the purpose of ejection of the workpiece 20. Plate 16 is secured to the die 40 by a plurality of bolts 23 which conveniently may be formed with eyes to facilitate handling the die assembly. Plate 16 is provided with an opening similar to the opening 15 in end plate 12 and, at this time, a vacuum plug 32 is placed in the opening and chamber B is evacuated. Under certain circumstances, for example, when the workpiece 20 is a wafer, with a thickness on the order of one inch or less, atmospheric pressure acting on end piece 12 may eject the workpiece into chamber B when the vacuum is applied. Normally, however, it is necessary to again place the die 40 in the isostatic press 50 for another pressurization period. This final step is shown in FIG. 1. The amount of pressure necessary to eject the workpiece 20 depends in part upon the size of the workpiece and varies greatly. Ejection may be noted, however, by providing a pressure gauge in conduit 62 and observing a sudden rise in the rate of increase in pressure. FIG. 8 represents the die assembly after ejection of the workpiece 20 into chamber B.

As shown in FIG. 2, each of the end pieces 12, 14 are provided with a seal of plastic material such as neoprene or the like. If desired, the end pieces may be provided with a coating 11 which may be metal, such as brass or tin, or may simply be, under certain conditions, a plastic, silicone or the like.

FIG. 9 shows a typical rubber plug 32 for the plate 16 and having a connector tube 27 fixed therein. FIG. 7 shows the die 40 with the plate 16 in place and with the plug 32 in the opening in the plate 16.

Although the assembly is shown with four eye bolts through cover 16 it will be understood that two or three or more eye bolts may be used as desired. In actual practice, it has been found convenient to use three equally spaced eye bolts for this purpose.

FIG. 12 shows an example of an arrangement of parts comprising modified end plates 12', 14' capable of producing a workpiece having a central opening therethrough. This is accomplished simply by placing a mandril 92 in end plate 14' and providing an opening for the mandril through end plate 12'. Under these circumstances, aspiration of the workpiece chamber is accomplished through an offset port. Although mandril 92 is shown as a simple rod or cylinder, it is to be understood that the mandril as well as the inner walls of die 40, may be of any practical size or shape.

In a typical example, a molding powder is heated in an oven to a temperature of 250° F. for 3 hours and then loaded into a die between end pieces as described above. A vacuum plug is fitted into one of the end pieces and pressure lowered by means of a vacuum pump for approximately one half hour. The attainment of a vacuum corresponding to 2–4 mm. of mercury is considered satisfactory.

After evacuation the die assembly is lowered into a pressure tank containing glycerin which has been preheated to 300° F. The tank is sealed and pressure gradually increased over a period of about 20 minutes until a pressure of around 20,000 p.s.i. has been reached. This pressure is maintained for 40 minutes before commencing a gradual return to atmospheric pressure taking about 20 minutes. More than one pressurization cycle is sometimes desirable, for example when an article of greater density is required.

After pressurization a plate is bolted on the open end of the die forming an ejection chamber which can be evacuated in a like manner to the evacuation of the workpiece chamber as described above. The walls of this chamber are counterbored to provide just sufficient clearance to facilitate removal of the workpiece.

In some instances evacuation of the ejection chamber will enable atmospheric pressure to force the workpiece into the ejection chamber. If not, the assembly is returned to the pressure tank and ejection is accomplished by a gradual increase in pressure. A sudden increase in pressure will indicate that the workpiece has completely moved into the ejection chamber.

When used to form explosive billets from particulate material, this process has been found to produce high quality billets with a length to diameter ratio of up to 1.5 and with close dimensional tolerances.

What is claimed is:
1. The method of forming articles of manufacture including the following steps:
    placing moldable mateiral in a walled container having a first space for forming a workpiece to close dimensional tolerances and a second space having a dimension which will provide a clearance between the workpiece and the walls of the container;
    confining said material in said first space;
    sequentially reducing the pressure in said first space to about 2–4 mm. of mercury and applying isostatic pressure to said container to cause said material to agglomerate into a coherent article having at least one dimension commensurate with a like dimension of said container;
    creating a differential pressure between said first space and said second space sufficient to cause said article to move into said second space where said clearance will facilitate removal of said article.
2. The method of claim 1 in which:
    said moldable material is a particulate mixture preheated to about 250° F.
3. The method according to claim 1 in which said material is highly explosive and said article is a high explosive billet.
4. The method according to claim 1 in which:
    said isostatic pressure is applied by immersing said container in inert liquid and pressurizing said liquid to about 20,000 p.s.i.

References Cited

UNITED STATES PATENTS

| 3,307,221 | 3/1967  | Bolner        | 18—16.5   |
| 2,942,298 | 6/1960  | Loedding      | 264—3     |
| 3,353,438 | 11/1967 | Scanlon et al.| 264—3 X   |
| 3,393,255 | 7/1968  | Pell et al.   | 264—3     |

CARL D. QUARFORTH, Primary Examiner

STEPHEN J. LECHERT, JR., Assistant Examiner

U.S. Cl. X.R.

86—20; 264—88, 89, 109